United States Patent
Strowitzky

(10) Patent No.: US 6,700,908 B1
(45) Date of Patent: Mar. 2, 2004

(54) DEVICE FOR AVOIDING SLIDING DISCHARGES IN PRE-IONIZATION IN A GAS LASER WITH CORONA DISCHARGE

(75) Inventor: Claus Strowitzky, Gilching (DE)

(73) Assignee: TUI Laser AG, Grafelfing (DE)

( * ) Notice: Subject to any disclaimer, the term of this patent is extended or adjusted under 35 U.S.C. 154(b) by 256 days.

(21) Appl. No.: 09/598,388

(22) Filed: Jun. 21, 2000

(30) Foreign Application Priority Data

Jun. 21, 1999 (DE) .......................... 199 28 358
Jul. 20, 1999 (DE) .......................... 199 34 013

(51) Int. Cl.⁷ .................................. H01S 3/03
(52) U.S. Cl. ........................ 372/38; 372/86; 372/87
(58) Field of Search ........................ 372/55, 38, 57, 372/29.013, 86, 87; 361/227; 427/485; 428/35.5

(56) References Cited

U.S. PATENT DOCUMENTS

| | | | | |
|---|---|---|---|---|
| 3,673,463 A | * | 6/1972 | Gourdine | 361/227 |
| 3,853,580 A | * | 12/1974 | Gourdine | 427/485 |
| 4,216,254 A | * | 8/1980 | Lundell et al. | 428/35.5 |
| 4,380,079 A | * | 4/1983 | Cohn | 372/87 |
| 4,718,072 A | | 1/1988 | Marchetti et al. | |
| 4,953,174 A | * | 8/1990 | Eldridge | 372/87 |
| 5,247,531 A | * | 9/1993 | Muller-Horsche | 372/86 |
| 5,293,390 A | * | 3/1994 | Furuya | 372/38 |
| 5,313,486 A | * | 5/1994 | Nakatani | 372/86 |
| 5,337,330 A | | 8/1994 | Larson | |
| 5,818,865 A | | 10/1998 | Watson et al. | |

FOREIGN PATENT DOCUMENTS

EP 798823 10/1997

* cited by examiner

*Primary Examiner*—Paul Ip
*Assistant Examiner*—Tuan Nguyen
(74) *Attorney, Agent, or Firm*—Burns, Doane, Swecker & Mathis, L.L.P.

(57) ABSTRACT

The present invention is a device for avoiding sliding discharges in pre-ionization in a gas laser with corona discharge. The invention uses a pair of main electrodes provided in a closed gas discharge volume, and at least one pair of corona electrodes which are arranged in the immediate vicinity of the pair of main electrodes. The individual electrodes, which include a tube-like sheathing of dielectric material, are designed to be open on both ends and contain an electrically conducting rod, or core, introduced into the interior and projecting beyond the sheathing. The invention is distinguished by the provision that the material selection, the shaping of various elements associated with the gas discharge volume, or a combination of material selection and shaping is made in such a way that a specific capacitance per unit area is provided in the surface region on both ends of the sheathing is lower than the capacitance in the central region of the sheathing between its both ends. Some of the elements that may be altered as to material selection and/or shaping considerations include the sheathing surrounding the electrically conducting core, the dielectric insert body inserted between said sheathing and said electrically conducting core, and the electrically conducting core.

21 Claims, 3 Drawing Sheets

DEVICE FOR AVOIDING SLIDING DISCHARGES IN PRE-IONIZATION IN A GAS LASER WITH CORONA DISCHARGE

FIELD OF THE INVENTION

The present invention relates generally to gas lasers. More specifically, the present invention relates to gas lasers having a corona discharge, and to avoiding sliding discharges during pre-ionization in such lasers.

BACKGROUND

Gas lasers with corona discharge are typically excimer lasers or TEA-$CO_2$ lasers. Without any restriction to the general type of gas lasers of this kind the description given hereinafter will be presented with reference to the example of excimer lasers.

For advanced excimer lasers in industrial applications corona discharges are employed for pre-ionization. A generally known electrode structure permitting pre-ionization is described in the U.S. Pat. No. 4,718,072. Small ceramic tubes are used for the corona electrodes, which are charged inside with a conductor preferably connected to ground potential and which are contacted outside by another conductor connected to another potential which is applied in a pulsed form to the outside of the small ceramic tube.

Prior to the actual discharge proper, a high-voltage pulse is applied to the electrodes of the small corona rods. As a result, a corona discharge is fired on the surface of the small ceramic tubes. The high-voltage pulse required to this end is either generated by an appropriate circuit or tapped from the electrodes of the main discharge means directly. The radiation of this discharge, which propagates on the surface of the small ceramic tubes, ionizes the gas before the actual discharge within the excimer laser.

The conductors, which extend inside the small ceramic tubes configured to be open on both ends, which conductors are also referred to as corona cores, project beyond the small ceramic tubes for reasons of better contacting at least on one side, and hence constitute a problem site with respect to a short-circuit site forming there.

Moreover, the corona cores join the surface of the small ceramic tubes on the ends of the tubes in a largely unprotected condition and are moreover immediately adjacent to one of the two main discharge electrodes of the excimer laser to which the high-voltage pulses are applied which are required for the gas discharge.

On the end of the small tubes a sliding discharge is created which extends from the main electrode to the corona core for causing the discharge of the high-voltage electrode, which prevents the establishment of a corona discharge. It is therefore important to avoid the occurrence of sliding discharges. Several approaches have become common for a solution to the sliding discharge problem.

One such approach uses an extension of the small tubes and the core path. By extension of the small tubes and the core the path of the sliding discharge can be made so long that spark-over will not occur. What is difficult is the accommodation of these elongate small tubes in a pressurized vessel of an excimer laser which, in correspondence with current specifications, should have a fairly small and compact design. Furthermore, a reduction of the length of the high-voltage electrode is conceivable, however, this provision reduces the efficiency of the laser substantially.

Another approach involves using thicker tubes. By this approach, the small tubes, which surround the corona cores, are manufactured of a thicker tube, preferably of a ceramic material, with meander-shaped grooves, so-called bushings, being machined on the end of the ceramic tube, as is described in the European Patent EP 0 798 823 A1. These bushings can serve to prolong the sliding path and to reduce the sliding discharge. What is a disadvantage is the high expenditure in manufacture.

Yet another approach involves separate manufacture of the bushings. The aforementioned bushings may also be manufactured separately from the small corona tubes and connected on the ends to the small tube. One example, in this context, is described in U.S. Pat. No. 5,337,330A. The problem in this case is the joining between bushings and the small corona tube.

SUMMARY OF THE INVENTION

The present invention is based on the problem of configuring a device for avoiding sliding discharges in pre-ionization in a gas laser with corona discharge, comprising a pair of main electrodes provided in a gas discharge volume, and at least one pair of corona electrodes disposed in the immediate vicinity of the pair of main electrodes, wherein the individual electrodes include a tube-like sheathing of dielectric material, are designed to be open on both ends and containing an electrically conducting rod, the so-called core, introduced into the interior and projecting beyond the sheathing on both ends, in such a way that the disadvantages set out above with respect to prior art can be avoided. In particular, a low-cost solution to the problem should be found which is easy to manufacture.

According to one embodiment of the present invention, a device is so configured that the selection of the material for and/or the shaping of the sheathing surrounding the electrically conducting core and/or a dielectric insert body adapted to be additionally introduced between the sheathing and the electrically conducting core and/or the electrically conducting core is made in such a way that a specific capacitance per unit area is provided in the surface area of both ends of the sheathing, which is lower than the capacitance in the central region of the sheathing between its both ends.

All the previous approaches, on the other hand, were based on the prolongation of the path of the sliding sparks. Another possibility supporting the invention consists in an impairment of the conditions of propagation of the sliding spark rather than a prolongation of the path.

In this context one should be aware of the causes of propagation of these sliding sparks. The pertinent theory has been known for a long time already and can be read in the respective literature. The basis of these sliding sparks is the specific capacity per unit area and the resulting displacement current.

For a reduction of the specific capacitance per unit area the insulating material can be made thicker (C~1/d). As the thickening of the tube towards the outside is very expensive in manufacture but can be well implemented in engineering terms on principle it is sensible to thicken the tube towards the inside.

The thickening of the small tube consisting of a dielectric material can be achieved with a thick-walled small tube which is pushed between the core and the tube. This insert can be made of a ceramic material or another insulating material, or a cavity can be used instead of the insert. The decisive aspect is the fact that the capacitance per unit area is reduced at the discharge end of the small tube so as to prevent the sliding discharges from propagating.

BRIEF DESCRIPTION OF THE DRAWINGS

A preferred embodiment of the invention is described in greater detail, with reference to the drawings, wherein.

DETAILED DESCRIPTION

To facilitate an understanding of the principles and features of the present invention, it is explained hereinafter with reference to its implementation in an illustrative embodiment. Specific design and materials choices, for example, are provided for illustration purposes. It will be appreciated, however, that this illustrative embodiment is not the only embodiment in which the invention can be implemented. Rather, it can find utility using a variety of suitable design and materials choices, as will become apparent from an understanding of the principles which underscore the invention.

Figure 1:
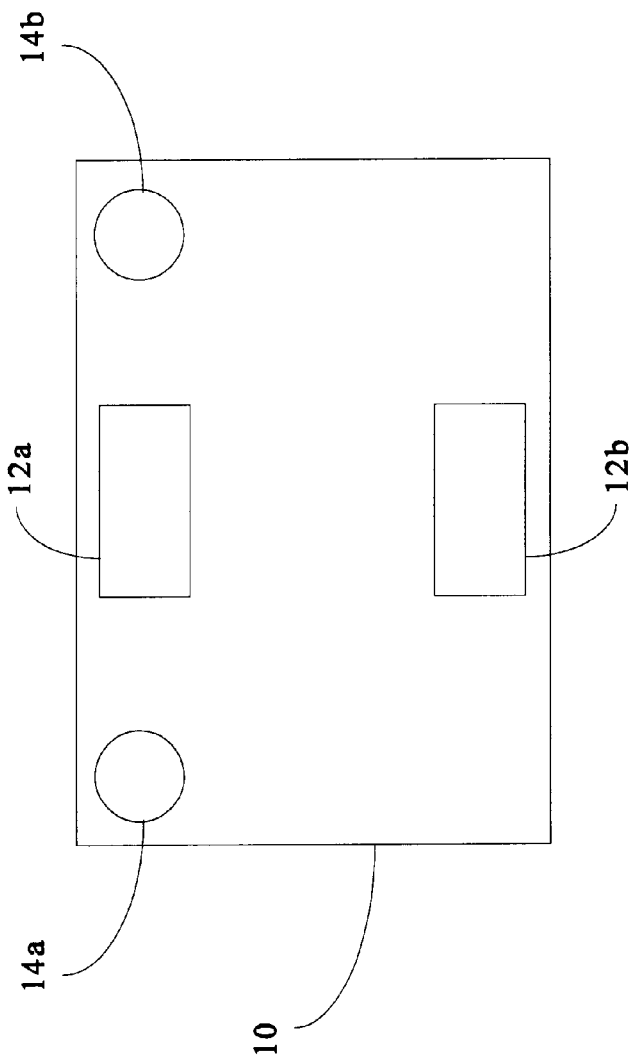
FIG. 1 illustrates a closed gas discharge volume in block-diagram form, in accordance with an embodiment of the present invention.

The present invention is directed to a device for avoiding sliding discharges in pre-ionization in a gas laser with corona discharge. A closed gas discharge volume, according to an embodiment of the present invention, is shown in FIG. 1. The invention uses a pair of main electrodes 12a, 12b provided in a closed gas discharge volume 10, and at least one pair of corona electrodes 14a, 14b which are arranged in the immediate vicinity of the pair of main electrodes 12a, 12b. The individual corona electrodes 14, which include a tube-like sheathing of dielectric material 102, are designed to be open on both ends and contain an electrically conducting rod, or core 106, introduced into the interior and projecting beyond the sheathing on both ends.

One of the ways in which the present invention is useful is in selecting materials and shaping various elements associated with the gas discharge volume in such a way that a specific capacitance per unit area is provided on both ends of the sheathing is lower than the capacitance of the central region of the sheathing. This may be accomplished by material selection and/or shaping considerations regarding the sheathing surrounding the electrically conducting core, the dielectric insert body between the sheathing and the electrically conducting core, and the electrically conducting core.

Figure 2:
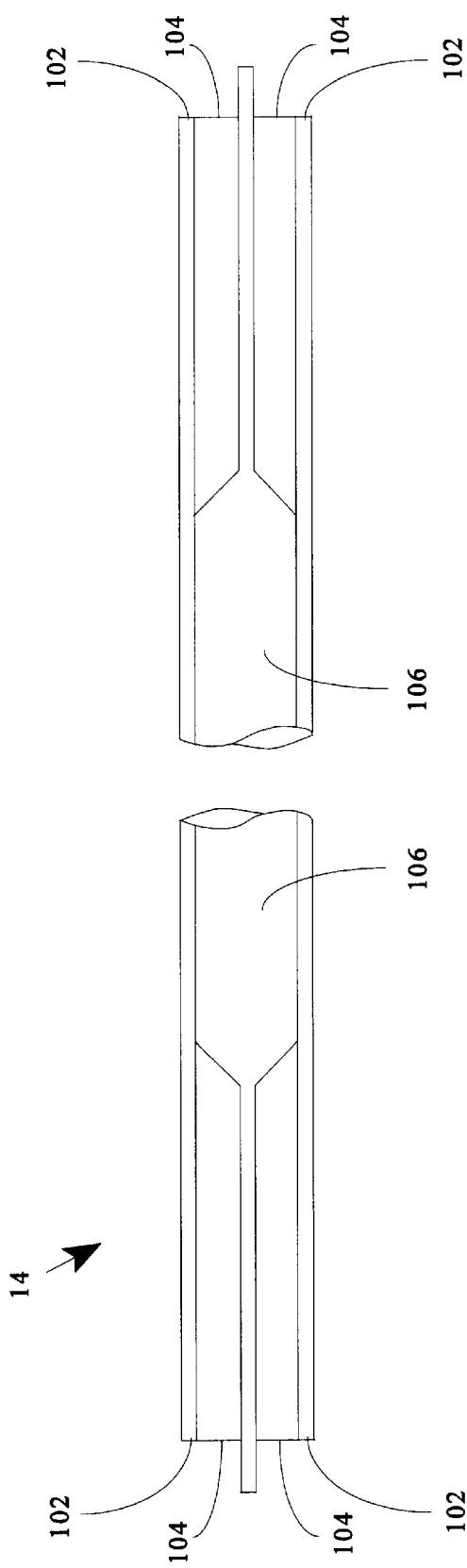
FIG. 2 illustrates a cross-sectional view taken through a corona electrode.

For a reduction of the capacitance per unit area at least on the end regions of the small corona tube 102 in the embodiment illustrated in FIG. 2, an insert 104 is pushed into the interior of the tube which is preferably made of the same material as the corona tube as such. A ceramic material is suitable as the preferred dielectric for the corona tube as well as for the insert.

The electrically conducting core 106 extends through the insert, which extends as rod-shaped insert element through the entire structure of the corona electrode.

The design of a core 106 having a slightly tapering configuration in the terminal regions, compared against its thickness in the central region within the corona electrode, is particularly expedient.

The corona tube 102 as such can also be designed with a tapering configuration in the terminal regions, i.e. it may have a smaller cross-section than in the central region, instead or in combination with the insert body which is provided in the terminal regions of the corona electrode for reasons of a facilitated manufacture. What is essential in a reduction of the capacitance per unit area in this region in order to avoid the occurrence of a sliding current.

The embodiment illustrated in FIG. 2 is very easy and inexpensive to manufacture. In particular standard ceramic tubes can be used into which a tapered core is inserted. Furthermore, any adhesive or other joining techniques are not necessary. With this arrangement it is possible to integrate the corona rods into a system in a simple manner.

Figure 3:
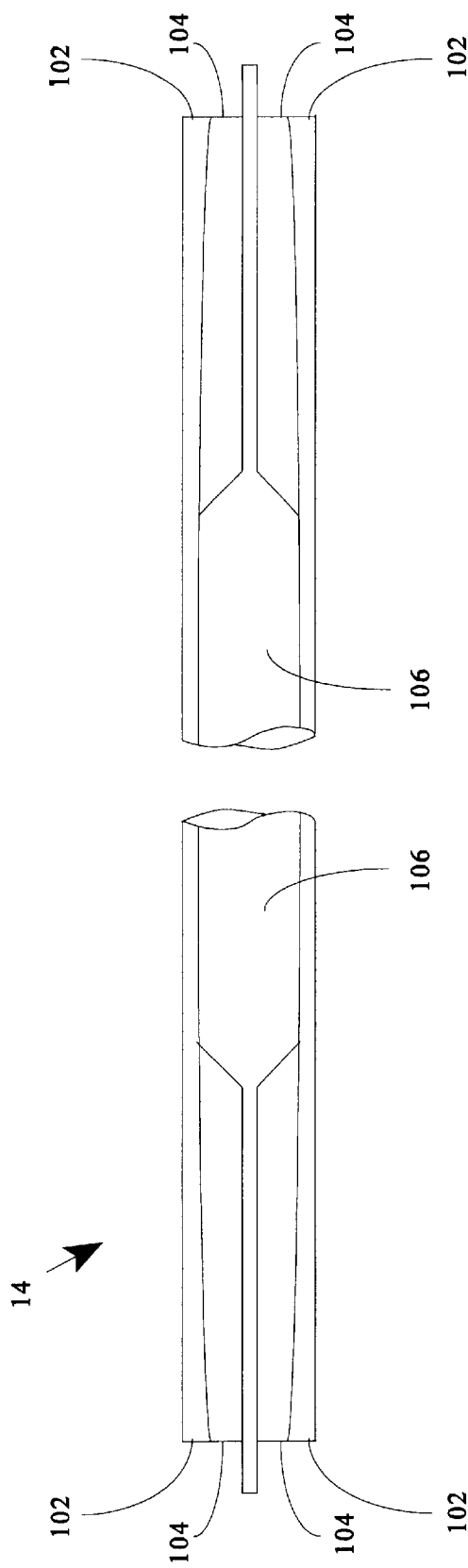
FIG. 3 illustrates a cross-sectional view taken through a corona electrode, in accordance with an embodiment of the present invention.

It will be appreciated by those skilled in the art that the present invention can be embodied in other specific forms without departing from the spirit or essential characteristics thereof. For example, as shown in FIG. 3, the corona electrodes 14 may be shaped such that the thickness of the tube is thicker in the end regions than in the central region, in accordance with an embodiment of the present invention.

The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. Device for avoiding sliding discharges in pre-ionization in a gas laser with corona discharge, comprising:
    a pair of main electrodes provided in a closed gas discharge volume; and
    at least one pair of corona electrodes which are arranged in the immediate vicinity of said pair of main electrodes,
    wherein the individual electrodes of the at least one pair of corona electrodes include a tube-like sheathing of dielectric material having a specific capacitance per unit area in a surface region on the ends of the sheathing that is lower than a capacitance per unit area in a central region of the sheathing between ends of the sheathing, and the individual electrodes of the at least one pair of corona electrodes are open on both ends and contain an electrically conducting rod, or core, introduced into the interior and projecting beyond the sheathing on both ends.

2. Device according to claim 1, wherein said tube-like sheathing is configured as a straight hollow cylinder having an envelope wall thickness in both end regions of the sheathing which exceeds the thickness in the central region of the sheathing, and the outside diameter of the sheathing is constant over the entire length of the sheathing.

3. Device according to claim 1, wherein said tube-like sheathing is configured as straight hollow cylinder having a constant inside and outside diameter over the entire length of the sheathing, and in both of said end regions insert bodies are inserted to fit precisely with the inside diameter of said sheathing, which bodies project from both end regions into the interior of the sheathing and enclose said electrically conducting core.

4. Device according to claim 3, wherein said insert bodies comprise a dielectric material.

5. Device according to claim 4, wherein said insert bodies comprise the same dielectric material as said sheathing.

6. Device according to claim 1, wherein said sheathing comprises a ceramic material.

7. Device according to claim 4, wherein said insert bodies comprise a ceramic material.

8. Device according to claim 1, wherein said electrically conducting core presents a smaller cross-section in its end regions than in its central region.

9. Device according to claim 1, wherein said gas laser is one of: an excimer laser and a TEA-$CO_2$ laser.

10. An apparatus for avoiding sliding discharges during pre-ionization in a gas laser with corona discharge, comprising:

a closed gas discharge volume, a pair of main electrodes disposed within the gas discharge volume, and a pair of corona electrodes disposed within the immediate vicinity of the pair of main electrodes, wherein the corona electrodes comprise a tube-like sheathing of dielectric material that is open on both ends, has a specific capacitance per unit area on both ends of the sheathing that is lower than a specific capacitance per unit area of the sheathing in a central region located between both of the ends of the sheathing, and contains an electrically conducting rod core disposed within the sheathing and protruding beyond the sheathing on both ends.

11. The apparatus of claim 10, wherein the material selection, shape, or a combination of selection and shape considerations of various elements made to reduce capacitance on the ends of the sheathing relative to the capacitance of the central region of the sheathing comprises changes to at least one of:

the sheathing surrounding the electrically conducting core;

a dielectric insert body adapted to be inserted between the sheathing and the electrically conducting core; and the electrically conducting core.

12. The apparatus of claim 10, wherein the tube-like sheathing is configured as a straight hollow cylinder having an envelope wall thickness in the region of both of the ends of the sheathing greater than the thickness in the central region of the sheathing, and the outside diameter of the sheathing is constant over the entire length of the sheathing.

13. The apparatus of claim 10, wherein both the inner and outer diameter of the tube-like sheathing is constant over the entire length of the sheathing, and insert bodies are inserted in each end of said sheathing to enclose said electrically conducting core, said insert bodies having a size such that they fit precisely within the inner diameter of the sheathing.

14. The apparatus of claim 13, wherein said insert bodies comprise a dielectric material.

15. The apparatus of claim 14, wherein said dielectric material is the same as the material of said sheathing.

16. The apparatus of claim 14, wherein said dielectric material comprises a ceramic material.

17. The apparatus of claim 10, wherein said electrically conducting core is configured such that its cross-section in the regions near each end of the core is smaller than in the central region.

18. The apparatus of claim 10, wherein said gas laser is one of: an excimer laser and a TEA-$CO_2$ laser.

19. Device according to claim 1, wherein the core is configured to have a smaller cross section in the area of both ends of the sheathing and a larger cross section in the central region of the sheathing.

20. Device according to claim 1, wherein the specific capacitance per unit area is provided by way of at least one of:

material selection of the corona electrode elements;

shaping of the sheaving surrounding the electrically conducting core;

shaping of a dielectric insert body adapted to be inserted between the sheathing and the electrically conducting core; and shaping the electrically conducting core.

21. The apparatus of claim 10, wherein the electrically conducting rod core is shaped such that it has a larger cross section in the central region of the sheathing and a narrower cross section in the region of both ends of the sheathing.

* * * * *